US012581492B2

(12) United States Patent
Gao et al.

(10) Patent No.: US 12,581,492 B2
(45) Date of Patent: Mar. 17, 2026

(54) TRANSMISSION INSTRUCTION METHOD, DEVICE, TERMINAL, BASE STATION AND STORAGE MEDIUM

(71) Applicant: ZTE Corporation, Shenzhen (CN)

(72) Inventors: Bo Gao, Shenzhen (CN); Zhaohua Lu, Shenzhen (CN); Yu Ngok Li, Shenzhen (CN); Chuangxin Jiang, Shenzhen (CN); Shujuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 280 days.

(21) Appl. No.: 17/489,348

(22) Filed: Sep. 29, 2021

(65) Prior Publication Data

US 2022/0167384 A1     May 26, 2022

Related U.S. Application Data

(63) Continuation of application No. PCT/CN2020/076801, filed on Feb. 26, 2020.

(30) Foreign Application Priority Data

Mar. 29, 2019     (CN) .......................... 201910253399.7

(51) Int. Cl.
*H04W 72/23*     (2023.01)
*H04L 1/1812*     (2023.01)
*H04L 5/00*     (2006.01)
*H04W 52/14*     (2009.01)

(52) U.S. Cl.
CPC .......... *H04W 72/23* (2023.01); *H04L 1/1812* (2013.01); *H04L 5/0051* (2013.01); *H04W 52/146* (2013.01)

(58) Field of Classification Search
CPC ..................................................... H04W 72/23
See application file for complete search history.

(56) References Cited

U.S. PATENT DOCUMENTS

| | | | | |
|---|---|---|---|---|
| 2018/0049137 A1* | 2/2018 | Li | ........................ | H04W 52/242 |
| 2020/0106647 A1* | 4/2020 | Chen | ...................... | H04W 72/04 |
| 2020/0119799 A1* | 4/2020 | Jung | ................... | H04B 7/06964 |
| 2020/0366445 A1* | 11/2020 | Takeda | .................. | H04L 1/1861 |

(Continued)

FOREIGN PATENT DOCUMENTS

| | | |
|---|---|---|
| CN | 108024344 A | 5/2018 |
| CN | 108112065 A | 6/2018 |

(Continued)

OTHER PUBLICATIONS

Supplementary European Search Report in European Patent Application No. 20783368 dated Nov. 28, 2022, 8 pages.

(Continued)

*Primary Examiner* — Abdeltif Ajid

(74) *Attorney, Agent, or Firm* — Crowell & Moring LLP

(57) ABSTRACT

Disclosed are an transmission indication method and apparatus, a terminal, a base station and a storage medium. The transmission indication method is applied to a terminal and includes: control signaling sent by a base station is received; an uplink transmission control parameter of an uplink reference signal is indicated through the control signaling; and the uplink reference signal is transmitted based on the uplink transmission control parameter.

14 Claims, 4 Drawing Sheets

(56)                References Cited

U.S. PATENT DOCUMENTS

2021/0250206 A1*   8/2021   Liu ..................... H04L 25/0226
2021/0377876 A1*  12/2021   Jeon ................... H04W 52/365
2022/0174609 A1*   6/2022   Kang ................... H04W 52/42

FOREIGN PATENT DOCUMENTS

CN          108365939 A      8/2018
CN          110536440 A     12/2019
WO    WO 2018/202014 A1    11/2018
WO    WO 2020/168296 A1     8/2020

OTHER PUBLICATIONS

Motorola et al., "Maintenance for UL power control," 3GPP TSG RAN WG1 Meeting #94-bis, R1-1811293, Sep. 29, 2018, 15 pages.
Sony, "Summary of SRS #2", 3GPP TSG RAN WG1 Meeting #95, R1-1814001, Nov. 15, 2018, 43 pages.
International Search Report and Written Opinion with English Translation for International Patent Application No. PCT/CN2020/076801 dated May 27, 2020; 9 pages.
Canadian Office Action in Canadian Patent Application No. 3,135,193 dated Jul. 10, 2023, 4 pages.
Office Action issued in Chinese Patent Application No. 202210316866.8 dated Aug. 27, 2024, w/English translation, 29 pages.
Communication pursuant to Article 94(3) EPC, Nov. 11, 2024, pp. 1-7, issued in European Application Number 20 783 368.2, European Patent Office, Rijswijk, Netherlands.
3rd Generation Partnership Project; Technical Specification Group Radio Access Network; NR; Medium Access Control (MAC) protocol specification (Release 15), Jan. 5, 2019, pp. 1-79, 3GPP TS 38321 V15.4.0, Sophia-Antipolis, France, Retrieved from the Internet: URL:http://www.3gpp.org/ftp/tsg%5Fran/WG2%5FRL2/Specifications/201812%5Fdraft%5Fspecs%5Fafter%5FRAN%5F82/Draft%5F38321 %2Df40%5Fv2%2Ezip.
Indonesian Office Action with English Translation of Stage 1 Substantive Examination Result for Indonesian Patent Application No. P00202109190 dated Jan. 19, 2024, 6 pages.
Office Action issued in Indonesian Patent Application No. P00202109190 dated Jul. 31, 2025, w/English translation, 6 pages.
Office Action issued in Korean Patent Application No. 10-2021-7031385 dated May 23, 2025, w/English translation, 12 pages.
Korean-language Office Action issued in Koran Application No. 10-2021-7031385 dated Jan. 12, 2026 with English translation (8 pages).

* cited by examiner

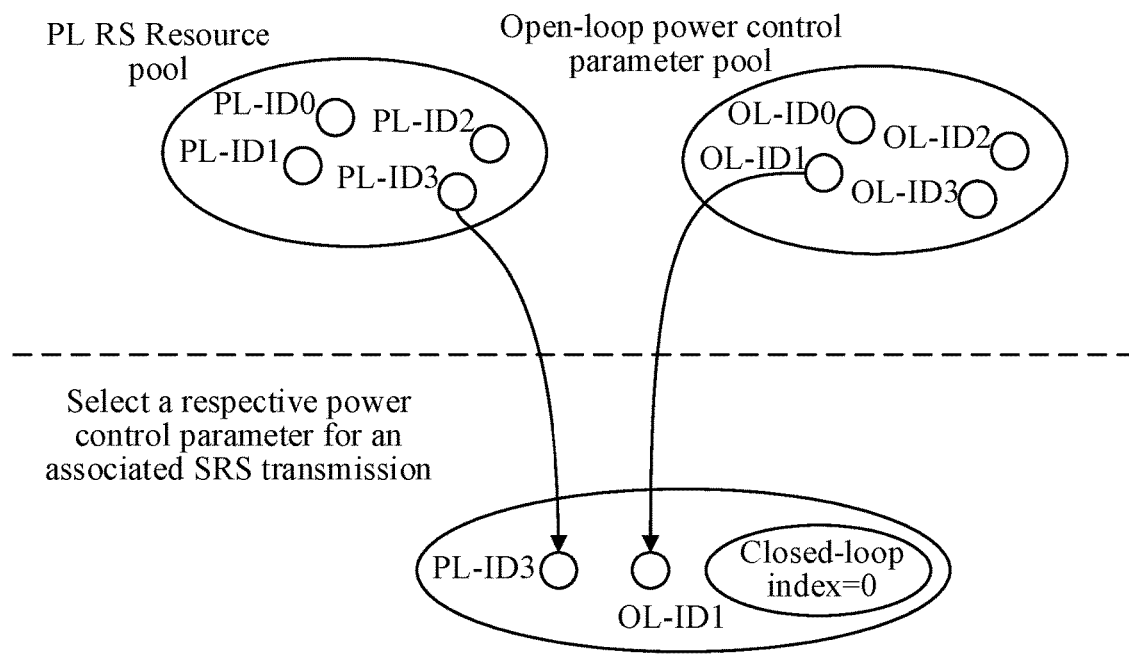

PL RS Resource pool

Open-loop power control parameter pool

PL-ID0   PL-ID2
PL-ID1   PL-ID3

OL-ID0   OL-ID2
OL-ID1   OL-ID3

Select a respective power control parameter for an associated SRS transmission

PL-ID3          OL-ID1          Closed-loop index=0

FIG. 3

Target reference signal/channel

Configure an aperiodic SRS resource

Configure L_t SRS-triggering states, where each state may be associated with a maximum of L_d aperiodic SRS resource sets RRC signaling Configure N spatial relationship states Configure L_d aperiodic SRS resource sets MAC-CE signaling Select an ap-SRS resource setting Associate each resource (total M SRS resources) in the aperiodic SRS resource sets with an alternative spatial relationship state DCI signaling Trigger X aperiodic SRS resource sets according to the SRS-triggering states

FIG. 4

Send control signaling to a terminal, where the control signaling is used for indicating an uplink transmission control parameter of an uplink reference signal    S2010

Receive the uplink reference signal sent by the terminal    S2020

Process the uplink reference signal    S2030

61    62    63

| Receiving module | Sending module | Processor |

71    72    73

| Sending module | Receiving module | Processor |

TRANSMISSION INSTRUCTION METHOD, DEVICE, TERMINAL, BASE STATION AND STORAGE MEDIUM

This application is a continuation application of PCT International Patent Application No. PCT/CN2020/076801, filed with the China National Intellectual Property Administration, PRC on Feb. 26, 2020, which claims priority to Chinese Patent Application No. 201910253399.7, filed with the China National Intellectual Property Administration, PRC on Mar. 29, 2019, each of which is incorporated herein by reference in their entireties.

TECHNICAL FIELD

The present application relates to the field of communications, and for example, a transmission indication method and apparatus, a terminal, a base station and a storage medium.

BACKGROUND

The ultra-wide bandwidth high-frequency-band (namely millimeter wave communication) becomes an important direction of mobile communication development, and attracts the worldwide academic community and industrial community. In particular, the advantages of millimeter wave have become increasingly attractive in increasingly congested spectrum resources and massive access to physical networks, and many standards organizations, such as an institute of electrical and electronics engineers (IEEE), a 3rd generation partnership project (3GPP), have begun to develop corresponding standardization efforts. For example, in the 3GPP standard group, the high-frequency-band communication would become an important innovation point for a new radio access technology (New RAT) of a fifth generation mobile communication technology (5G) by virtue of the significant advantage of a large bandwidth.

In an antenna weight (also referred to as precoding, beam) training process, a high-frequency-band sending terminal sends training pilots, and a receiving terminal receives a channel and performs a channel estimation. Then, the high-frequency-band receiving terminal needs to feed back channel state information to the high-frequency-band sending terminal, so that a sending and receiving terminal may find multiple groups of sending and receiving terminal antenna weight pairs required for the multi-path data transmission from selectable sending and receiving terminal antenna weight pairs, and thus the overall spectrum efficiency is improved.

In a 5G communication system, since it is required that a flexibility of a beam configuration of an uplink data channel and an uplink reference signal is set to be higher than a flexibility of a power control parameter configuration of a data channel and a reference signal, so that power control parameters of an uplink data signal and an uplink reference signal in an actual system cannot be updated in time, causing a problem that the uplink interference is aggravated.

SUMMARY

The present application provides a transmission indication method and apparatus, a terminal, a base station and a storage medium, so that an uplink transmission control parameter may be updated synchronously.

An embodiment of the present application provides a transmission indication method. The transmission indication method is applied to a terminal, and includes: control signaling sent by a base station is received; an uplink transmission control parameter of an uplink reference signal is indicated through the control signaling; and the uplink reference signal is transmitted based on the uplink transmission control parameter.

An embodiment of the present application provides a transmission indication method. The transmission indication method is applied to a base station, and includes: control signaling is sent to a terminal, where the control signaling is used for indicating an uplink transmission control parameter of an uplink reference signal; the uplink reference signal sent by the terminal is received; and the uplink reference signal is processed.

An embodiment of the present application provides a transmission indication apparatus. The transmission indication apparatus includes a receiving module, a sending module and at least one processor. The receiving module is configured to receive control signaling sent by a base station. The sending module is configured to transmit an uplink reference signal based on an uplink transmission control parameter. The at least one processor is configured to indicate the uplink transmission control parameter of the uplink reference signal through the control signaling.

An embodiment of the present application provides a transmission indication apparatus. The transmission indication apparatus includes a sending module, a receiving module and at least one processor. The sending module is configured to send control signaling to a terminal, where the control signaling is used for indicating an uplink transmission control parameter of an uplink reference signal. The receiving module is configured to receive the uplink reference signal sent by the terminal. The at least one processor is configured to process the uplink reference signal.

An embodiment of the present application provides a terminal. The terminal includes an transmission indication apparatus including a receiving module provided in the embodiments of the present application, and the receiving module is configured to receive control signaling sent by a base station.

An embodiment of the present application provides a base station. The base station includes a transmission indication apparatus including a sending module provided in the embodiments of the present application. The sending module is configured to send control signaling to a terminal, and the control signaling is used for indicating uplink transmission control parameter of an unlink reference signal.

An embodiment of the present application provides a storage medium. The storage medium stores a computer program, where the computer program, when executed by a processor, performs any one of the methods in the embodiments of the present application.

BRIEF DESCRIPTION OF DRAWINGS

FIG. 3 is a schematic diagram of configuring a power control parameter of an SRS resource set through control signaling in the present application;

FIG. 4 is a schematic diagram illustrating that information of an SRS spatial relation parameter is configured through control signaling in the present application;

DETAILED DESCRIPTION

Embodiments of the present application will now be described in detail with reference to the accompanying drawings.

Figure 1:
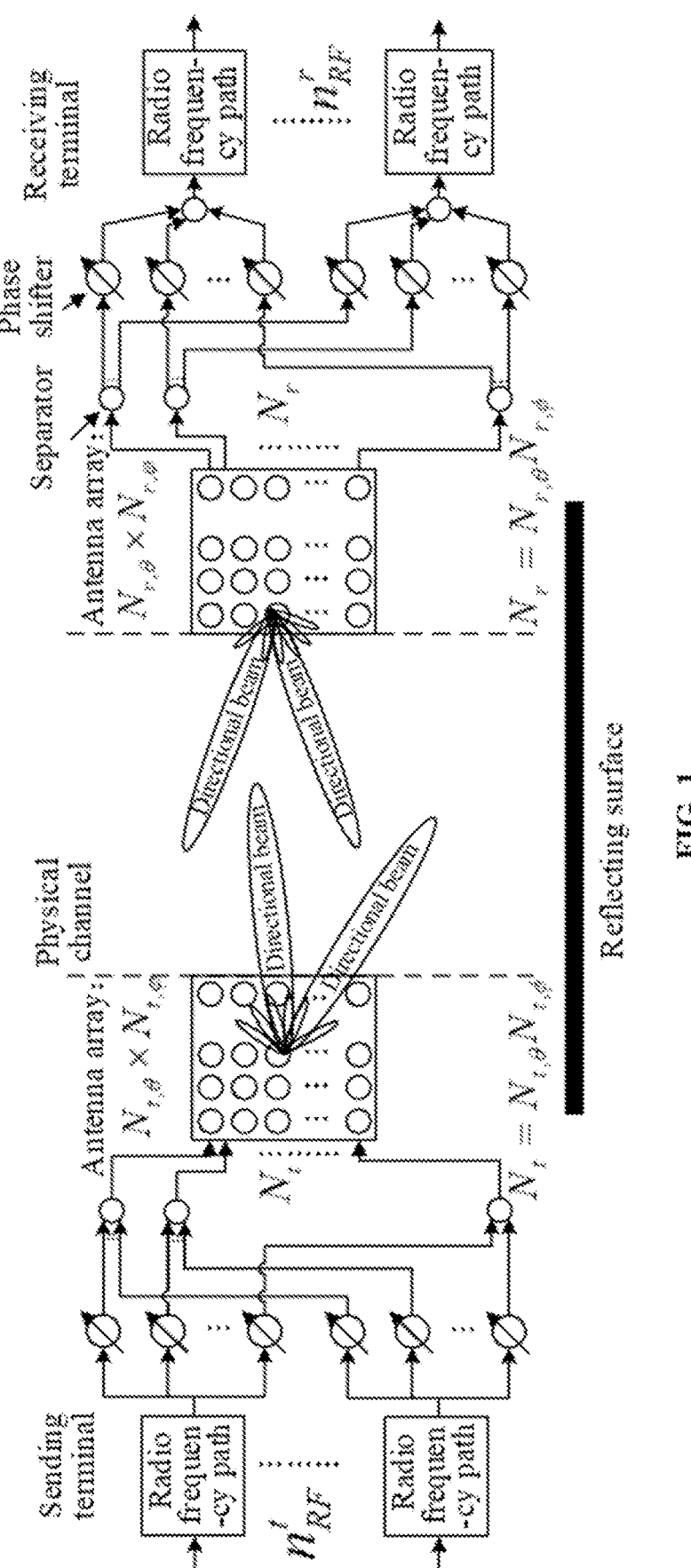
FIG. 1 is a schematic structural diagram of a hybrid precoding transceiver involved in the present application.

FIG. 1 is a schematic structural diagram of a hybrid precoding transceiver involved in the present application. The hybrid precoding transceiver may also be referred to as a hybrid analog-to-digital beamforming transceiver. Referring to FIG. 1, a system sending terminal and a system receiving terminal are configured with a multi-antenna unit and multiple radio frequency links. In this embodiment, the sending terminal may be considered as a terminal, and the receiving terminal may be considered as a base station end. Each radio frequency link is interconnected with an antenna array unit (not excluding a partial-connection scenario), and each antenna unit has a digital keying phase shifter. A method of loading different phase shift magnitudes onto signals on multiple antenna units enables a high-frequency-band system to achieve a beamforming of an analog terminal. In an embodiment, in the hybrid analog-to-digital beamforming transceiver, there are multiple radio frequency signal streams. Each signal stream is sent from the multi-antenna unit to a high-frequency-band physical propagation channel by loading a precoding antenna weight vector (AWV) through the digital keying phase shifter onto the signal stream; at the receiving terminal, radio frequency signal streams received by the multi-antenna unit are weighted and combined into a single signal stream, and the single signal stream is radio frequency demodulated via the receiving terminal, a receiver finally obtains multiple received signal streams, and the multiple received signal streams are sampled and received by a digital baseband.

A beam may be a resource (e.g., a sending terminal spatial filter, a receiving terminal spatial filter, a sending terminal precoding, a receiving terminal precoding, an antenna port, an antenna weight vector, an antenna weight matrix, etc.), and a beam sequence number may be replaced by a resource index (e.g., a reference signal resource index), since the beam may be bound to some time-frequency code resources in transmission. The beam may also be a transmission (sending/receiving) manner; and the transmission manner may include a space division multiplexing, a frequency domain/time domain diversity, etc.

Moreover, the base station end, i.e. a base station, may perform a quasi co-location configuration on two reference signals and inform a user end, i.e., the terminal, to describe the channel characteristic assumption. Parameters related to a quasi co-location at least include a doppler spread, a doppler translation, a delay spread, an average delay, an average gain and a spatial parameter. In this embodiment, the spatial parameter may include a spatial receiving parameter, such as an angle of arrival, a spatial correlation of a receiving beam, an average delay, and a correlation of time-frequency channel response (including phase information). The reference signal includes at least one of:

1) a channel state information reference signal (CSI-RS),
2) a channel state information interference measurement (CSI-IM) signal,
3) a demodulation reference signal (DMRS), 4) a downlink demodulation reference signal (DL DMRS),
5) an uplink demodulation reference signal (UL DMRS),
6) a channel sounding reference signal (SRS),
7) a phase-tracking reference signal (PTRS),
8) a random access channel (RACH) signal,
9) a synchronization signal (SS),
10) a synchronization signal block (SS block),
11) a primary synchronization signal (PSS), or
12) a secondary synchronization signal (SSS).

In order to solve a technical problem that a beam configuration parameter and a power control parameter of an uplink transmission control parameter, i.e., an uplink reference signal, cannot be updated synchronously, this embodiment provides a transmission indication method.

Figure 2:
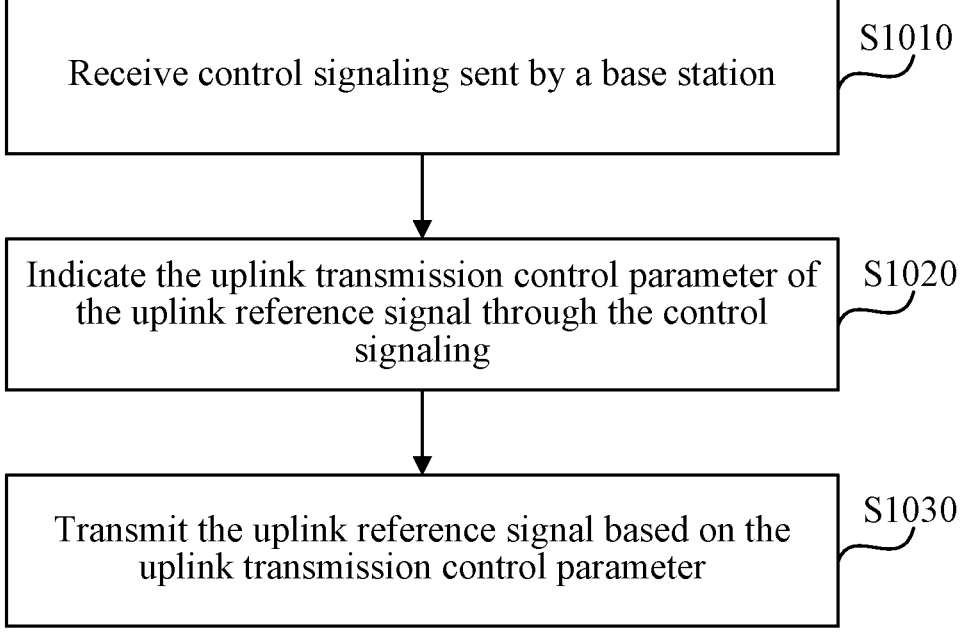
FIG. 2 is a schematic flowchart of a transmission indication method provided in the present application.

FIG. 2 is a schematic flowchart of a transmission indication method provided in the present application. The method may be applied to a condition that an uplink transmission control parameter of an uplink reference signal is configured when the uplink reference signal is transmitted, the method may be executed by a transmission indication apparatus including a receiving module in the present application, the receiving module is configured to receive control signaling sent by a base station, and the apparatus may be implemented by software and/or hardware and is integrated in a terminal. The terminal encompasses any suitable type of wireless user equipment, such as a mobile telephone, a portable data processing apparatus, a portable web browser, or an in-vehicle mobile station.

As shown in FIG. 2, the transmission indication method provided in the present application is applied to the terminal and includes the following steps.

In S1010, control signaling sent by a base station is received.

When the terminal performs transmission indication, the terminal may firstly receive the control signaling sent by the base station so as to perform the transmission configuration, such as a configuration of the uplink reference signal, based on the received control signaling.

In this step, the terminal may receive data transmitted by the base station in real time and analyze the received data so as to extract the control signaling for the transmission indication. In this embodiment, the control signaling may be understood as signaling for configuring a transmission manner of the uplink reference signal. The control signaling may be used for indicating the uplink transmission control parameter.

In S1020, the uplink transmission control parameter of the uplink reference signal is indicated through the control signaling.

The uplink reference signal may be understood as a reference signal sent by the terminal to the base station, and a content of the reference signal is not limited here. In an embodiment, the uplink reference signal sent by the terminal to the base station may be determined by the control signaling received by the terminal. The control signaling may carry an index of an uplink reference signal which the terminal needs to send to the base station, and the index may be used for identifying an uplink reference signal which needs to be transmitted. The uplink reference signals may include a channel sounding reference signal (SRS), a phase tracking reference signal (PTRS), a physical random access channel (PRACH), an uplink demodulation reference signal (UL DMRS), and the like.

After the control signaling is received, the terminal may indicate the uplink transmission control parameter of the uplink reference signal based on the control signaling, so that the uplink transmission signal is transmitted based on the indicated uplink transmission control parameter.

In this embodiment, the uplink transmission control parameter may be understood as a control parameter upon the uplink reference signal being transmitted. A content of the uplink transmission control parameter may not be limited, and the uplink transmission control parameter may include a control parameter required by transmission of the uplink transmission signal.

In an embodiment, the uplink transmission control parameter may include a beam configuration parameter and a power control parameter. In an embodiment, the beam configuration parameter may be understood as a spatial relation parameter. The power control parameter may be understood as a power control parameter.

In an embodiment, the power control parameter includes at least one or a combination of the following: 1. an open-loop power control parameter, 2. a path loss (PL) reference signal, or 3. a closed-loop power control index. In an embodiment, the open-loop power control parameter may be composed of a path loss adjustment coefficient alpha and/or a target power p0. A magnitude of the power may be changed by changing a magnitude of alpha.

In an embodiment, in a case where the uplink transmission control parameter of the uplink reference signal is indicated based on the control signaling, an indication policy may be determined based on a content included in the uplink transmission control parameter.

Exemplarily, in a case where the uplink transmission control parameter includes the power control parameter, the control signaling may determine a corresponding power control parameter based on a resource set of the uplink reference signal. In an embodiment, the resource set of the uplink reference signal may be configured by radio resource control (RRC) signaling, and the RRC signaling may be sent by the base station; in a case where a triggered uplink reference signal is an aperiodic uplink reference signal, a corresponding power control parameter may be determined by downlink control information (DCI), a downlink physical control channel (PDCCH), or a power control parameter at an initial sending moment of an uplink reference signal resource set associated with the uplink reference signal; and in a case where the uplink transmission control parameter includes the spatial relation parameter, the control signaling may be based on the DCI, a spatial relation parameter at a transmission moment of a downlink control channel, a spatial relation parameter at a sending moment of the uplink reference signal, a spatial relation parameter at an initial sending moment of an uplink reference signal resource set associated with a triggering state of the uplink reference signal, and/or a spatial relation parameter at an initial sending moment of at least one uplink reference signal resource set associated with the uplink reference signal, and the control signaling may also be selected from a spatial relation set.

In S1030, the uplink reference signal is transmitted based on the uplink transmission control parameter.

After the control signaling indicates the uplink transmission control parameter, the uplink reference signal may be transmitted based on the indicated uplink transmission control parameter, so that the uplink transmission control parameter can be synchronously updated when the uplink reference signal is transmitted.

According to the transmission indication method provided in this embodiment, the uplink transmission control parameter of the uplink reference signal is indicated based on the control signaling received from the base station, and then the uplink reference signal is transmitted based on the uplink transmission control parameter. A technical problem that the uplink transmission control parameter cannot be updated synchronously is solved, and the synchronous updating of the uplink transmission control parameter is achieved.

The terminal in this embodiment may be a user end, updates a channel characteristic assumption for {Aperiodic/Semi-persistent (AP/SP)}-SRS, and determines a power control parameter of the SRS/a physical Uplink Shared Channel (PUSCH). The transmission indication method in this embodiment may be considered as a method of a sending configuration in a data channel and a reference signal. The reference signal may assist in a data signal sending.

On the basis of the above-described embodiments, a modified embodiment of the above-described embodiments is proposed, and it should be noted here that in order to make a brief description, only the differences from the above-described embodiments are described in the modified embodiment.

In an embodiment of the present application, the control signaling includes media access control-control element (MAC-CE) signaling.

The MAC-CE signaling may be understood as signaling which is in a media access control (MAC) and is capable of indicating the uplink transmission control parameter of the uplink reference signal. After the terminal receives the MAC-CE signaling sent by the base station, the terminal indicates the uplink transmission control parameter of the uplink reference signal based on the MAC-CE signaling. The MAC-CE signaling may be used for configuring the uplink transmission control parameter and guarantee synchronous updating of the uplink transmission control parameter, for example, the MAC-CE signaling may configure the power control parameter and the spatial relation parameter in the uplink transmission control parameter so as to guarantee the synchronous updating of the power control parameter and the spatial relation parameter.

In an embodiment of the present application, the uplink reference signal includes a channel sounding reference signal (SRS), a phase tracking reference signal (PTRS), and a physical random access channel (PRACH).

In an embodiment of the present application, an effective time of an indication of the control signaling is determined by a sending time of hybrid automatic repeat request-acknowledgement (HARQ-ACK) signaling associated with a physical downlink shared channel (PDSCH) carrying the control signaling.

According to the present application, an effective time of the uplink transmission control parameter configured by the control signaling may be determined according to a sending time of a HARQ-ACK associated with a physical downlink shared channel bearing the uplink reference signal, and a configuration means may be determined according to an actual scene for transmitting the uplink reference signal.

In an embodiment of the present application, the uplink transmission control parameter includes a power control parameter. Power based on which the uplink reference signal is transmitted may be set based on the power control parameter.

In an embodiment of the present application, the step in which the uplink transmission control parameter of the uplink reference signal is indicated through the control signaling includes at least one of: an open-loop power control parameter in the power control parameter is associated with a resource set of the uplink reference signal through the control signaling; an element index in an open-loop power control parameter set in the power control parameter is associated with a resource set of the uplink reference signal through the control signaling; a path loss reference signal in the power control parameter is associated with the resource set of the uplink reference signal through the control signaling; an element index in a path loss reference signal set in the power control parameter is associated with the resource set of the uplink reference signal through the control signaling; or a closed-loop power control index in the power control parameter is associated with the resource set of the uplink reference signal through the control signaling.

In an embodiment, a condition under which the uplink transmission control parameter is indicated according to the resource set of the uplink reference signal is that: the uplink reference signal is used for beam management, a codebook mode, a non-codebook mode, antenna switching, or positioning.

When the uplink transmission control parameter of the uplink reference signal is indicated through the control instruction, the uplink transmission control parameter may be determined based on the resource set of the uplink reference signal.

In an embodiment, in a case where the power control parameter in the uplink transmission control parameter is determined, at least one of the following may be configured: the open-loop power control parameter, the path loss reference signal, or the closed-loop power control index.

When the open-loop power control parameter in the power control parameter is configured, it is feasible to directly configure the open-loop power control parameter, and it is also feasible to configure the element index in the open-loop power control parameter set.

In an embodiment, the control signaling may be the MAC-CE signaling, and the uplink reference signal may be the SRS. The step in which the uplink transmission control parameter of the uplink reference signal is indicated through the control signaling may include at least one of: the MAC-CE signaling designates that the open-loop power control parameter is associated with a resource set of the SRS; or the MAC-CE signaling designates that the element index in the open-loop power control parameter set is associated with a resource set of the SRS; the MAC-CE signaling designates that the path loss (PL) reference signal is associated with an SRS resource set of the SRS; or the MAC-CE signaling designates that an element index in a path loss (PL) reference signal set is associated with the resource set of the SRS, or the MAC-CE signaling designates a closed-loop power control index of the physical uplink shared channel (PUSCH) or a closed-loop power control index in the SRS is associated with the SRS resource set.

Exemplarily, FIG. 3 is a schematic diagram of configuring a power control parameter of an SRS resource set through control signaling in the present application; as shown in FIG. 3, the RRC signaling may configure or reconfigure a path loss (PL) reference signal (RS) resource pool and an open-loop power control parameter pool. In an embodiment, parameters of each resource pool are renumbered. Then, a power control parameter is configured for one SRS resource set through the control signaling, such as the MAC-CE signaling, and a power control parameter of the SRS resource set and a power control parameter associated with the SRS resource set are configured, which includes a PL RS, an open-loop parameter and a closed-loop index value. That the power control parameter of the SRS resource set is configured may include: a corresponding PL RS is selected from a PL RS resource pool, such as PL-identifier 3 (ID3) selected in FIG. 3; a corresponding open-loop power control parameter is selected from the open-loop power control parameter pool, such as an open-loop-ID1 (OL-ID1) selected in FIG. 3; and the closed-loop power control index is indicated.

Table 1 shows a signaling format of the control signaling for configuring a power control parameter of the SRS in the present application.

TABLE 1

| A table showing a signaling format of the control signaling for configuring a power control parameter of the SRS in the present application. |
| --- |
| SRS resource set index |

| SRS resource set | P0/alpha/reference signal index/closed-loop power control index |
| --- | --- |

Referring to Table 1, different from FIG. 3, Table 1 provides a signaling method for directly configuring the power control parameter of the SRS, that is, a required open-loop power control parameter (which may include P0 and alpha), a reference signal index, and a closed-loop power control index are explicitly configured for a specified SRS resource set.

In an embodiment of the present application, the step in which the uplink transmission control parameter of the uplink reference signal is indicated through the control signaling includes at least one of: an open-loop power control parameter in the power control parameter is associated with an uplink reference signal resource in a resource set of the uplink reference signal through the control signaling; or an element index in an open-loop power control parameter set in the power control parameter is associated with an uplink reference signal resource in a resource set of the uplink reference signal through the control signaling; a path loss reference signal in the power control parameter is associated with the uplink reference signal resource in the resource set of the uplink reference signal through the control signaling; or an element index in a path loss reference signal set in the power control parameter is associated with the uplink reference signal resource in the resource set of the uplink reference signal through the control signaling; or a closed-loop power control index in the power control parameter is associated with the uplink reference signal resource in the resource set of the uplink reference signal through the control signaling.

In an embodiment, a condition under which the uplink transmission control parameter is indicated according to the uplink reference signal resource in the resource set of the uplink reference signal may be that the uplink reference signal is used for a non-codebook mode, antenna switching, or positioning.

When the control signaling indicates the uplink transmission control parameter, the power control parameter may be determined based on the uplink reference signal resource in the resource set of the uplink reference signal.

The control signaling being the MAC-CE signaling and the uplink reference signal being the SRS is used as an example, the step in which the uplink transmission control parameter of the uplink reference signal is indicated through the control signaling may include at least one of: the MAC-CE signaling designates that the open-loop power control parameter is associated with an SRS resource of an SRS to be transmitted; or the MAC-CE signaling designates that the element index in the open-loop power control parameter set is associated with an SRS resource of an SRS to be transmitted; the MAC-CE signaling designates that the path loss (PL) reference signal is associated with the SRS resource of the SRS to be transmitted; or the MAC-CE signaling designates that an element index in a path loss (PL) reference signal set is associated with the SRS resource of the SRS to be transmitted, or the MAC-CE signaling designates a closed-loop power control index of the PUSCH or a closed-loop power control index of the SRS is associated with the SRS resource of the SRS to be transmitted.

Exemplarily, Table 2 shows another signaling format of the control signaling for configuring a power control parameter of the SRS in the present application.

TABLE 2

| Another signaling format of the control signaling for configuring a power control parameter of the SRS in the present application. | |
| --- | --- |
| | SRS resource set index |
| SRS resource 0: | P0/alpha/reference signal index/closed-loop power control index |
| SRS resource 1: | P0/alpha/reference signal index/closed-loop power control index |
| . . . | . . . |
| SRS resource k: | P0/alpha/reference signal index/closed-loop power control index |

As shown in Table 2, in a case where the SRS is used for a non-codebook transmission mode or antenna switching, the MAC-CE signaling designates one SRS resource set that needs to be configured, and a corresponding power control parameter (including P0/alpha), a corresponding reference signal index, and a corresponding closed-loop power control index are configured for each SRS resource in the set.

In an embodiment of the present application, after the uplink transmission control parameter of the uplink reference signal is indicated through the control instruction, it may include at least one or a combination of: in a case where an aperiodic uplink reference signal is triggered through the control instruction, a power control parameter of the aperiodic uplink reference signal is determined according to a power control parameter at a transmission moment of downlink control information (DCI) of the triggered aperiodic uplink reference signal or a downlink control channel of the triggered aperiodic uplink reference signal; in a case where an aperiodic uplink reference signal is triggered through the control instruction, a power control parameter of the aperiodic uplink reference signal is determined according to a power control parameter at a sending moment of the triggered aperiodic uplink reference signal; in a case where an aperiodic uplink reference signal is triggered through the control instruction, a power control parameter of the aperiodic uplink reference signal is determined according to a power control parameter at an initial sending moment of an uplink reference signal resource set associated with a triggering state of the triggered aperiodic uplink reference signal; or in a case where an aperiodic uplink reference signal is triggered through the control instruction, a power control parameter of the aperiodic uplink reference signal is determined according to a power control parameter at an initial sending moment of at least one uplink reference signal resource set associated with the triggered aperiodic uplink reference signal.

In an embodiment, at least one uplink reference signal resource set associated with the uplink reference signal may be used for antenna switching.

When the uplink transmission control parameter is configured, if the aperiodic uplink reference signal is triggered, the uplink transmission control parameter is determined according to a power control parameter at a transmission time of the DCI of the triggered SRS or the PDCCH of the triggered SRS, a power control parameter at a sending moment of the triggered SRS, a power control parameter at an initial sending moment of an SRS resource set associated with a triggering state of the triggered SRS, and/or a power control parameter at an initial sending moment of at least one SRS resource set associated with the triggered SRS, the determination means may be set according to an actual situation. In an embodiment, at least one SRS resource set associated with the triggered SRS is used for the antenna switching.

In an embodiment of the present application, the uplink transmission control parameter may include a spatial relation parameter.

In a case where the uplink transmission control parameter includes the spatial relation parameter, a beam configuration parameter of the uplink reference signal may be set. In a case where the uplink transmission control parameter includes the spatial relation parameter and the power control parameter, the synchronous updating of the power control parameter and the spatial relation parameter of the uplink reference signal can be achieved when the uplink reference signal is transmitted based on the uplink transmission control parameter indicated by the control instruction.

In an embodiment of the present application, the step in which the uplink transmission control parameter of the uplink reference signal is indicated through the control signaling includes: the uplink reference signal is activated or deactivated, or a spatial relation parameter of the uplink reference signal is configured; where the uplink reference signal is a semi-persistent uplink reference signal.

The semi-persistent uplink reference signal may be activated or deactivated by the control signaling, and a spatial relation parameter corresponding to the uplink reference signal are configured by the control signaling.

In an embodiment of the present application, the step in which the uplink transmission control parameter of the uplink reference signal is indicated through the control signaling includes: a spatial relation parameter of the uplink reference signal is configured through the control signaling; where the uplink reference signal is an aperiodic uplink reference signal.

The triggering of the aperiodic uplink reference signal may be triggered by the DCI, and the spatial relation parameter of the aperiodic uplink reference signal may be configured by the control signaling.

In an embodiment of the present application, the control signaling includes a grouping index in a case where a reference signal with which the spatial relation parameter is associated is a downlink reference signal.

The control signaling may include a grouping index in a case where a reference signal with which the spatial relation parameter is associated is the path loss reference signal.

In an embodiment of the present application, the control signaling includes a grouping index in a case where the uplink reference signal is used for beam management or antenna switching.

The grouping index may be a resource set index, an antenna panel index, a sub-antenna panel index, an antenna port group index, a beam group index, a transmission unit, or a receiving unit. In an embodiment, the grouping index may be used for describing the antenna panel and features associated with the antenna panel, and the feature is not limited. The grouping index may also be referred as a grouping state.

In an embodiment of the present application, the spatial relation parameter is selected from an spatial relation parameter set, where the spatial relational parameter set is configured by radio resource control (RRC) signaling.

In an embodiment, the grouping index may be used for determining whether a reference signal or channel associated with the grouping index can be sent simultaneously, or for determining whether a reference signal or channel with which the grouping index is associated can be received simultaneously.

In an embodiment, the grouping index may be used for determining a requirement for scheduling delay of a reference signal or channel with which the grouping index is associated.

In an embodiment, the grouping index may be used for determining whether large-scale parameters of a reference signal or channel with which the grouping index is associated are the same or similar. In an embodiment, the large-scale parameters include a path loss, a coupling loss, a timing advance, a doppler translation, and the like.

In an embodiment of the present application, the step in which the uplink transmission control parameter of the uplink reference signal is indicated through the control signaling includes at least one or a combination of: in a case where an aperiodic uplink reference signal is triggered through the control instruction, a spatial relation parameter associated with the triggered uplink reference signal is determined according to a spatial relation parameter at a transmission moment of DCI of the triggered uplink reference signal or a downlink control channel (PDCCH) of the triggered uplink reference signal; in a case where an aperiodic uplink reference signal is triggered through the control instruction, a spatial relation parameter associated with the triggered uplink reference signal is determined according to a spatial relation parameter at a sending moment of the triggered uplink reference signal; in a case where an aperiodic uplink reference signal is triggered through the control instruction, a spatial relation parameter associated with the triggered uplink reference signal is determined according to a spatial relation parameter at an initial sending moment of an uplink reference signal resource set associated with a triggering state of the triggered uplink reference signal; or in a case where the aperiodic uplink reference signal is triggered through the control instruction, a spatial relation parameter associated with the triggered uplink reference signal is determined according to a spatial relation parameter at an initial sending moment of at least one uplink reference signal resource set associated with the triggered uplink reference signal.

In an embodiment, the at least one uplink reference signal resource set associated with the uplink reference signal is used for antenna switching.

FIG. 4 is a schematic diagram of configuring information of an SRS spatial relation parameter through control signaling in the present application. Referring to FIG. 4, for an aperiodic SRS resource, one spatial relation state set (high-layer signaling SRS Config), $L_d$ aperiodic SRS resource sets, and Lt SRS triggering states may be configured by the RRC signaling may be configured through RRC signaling, where each triggering state may be associated with at most $L_d$ aperiodic SRS resource sets. $L_d$ and $L_t$ may be positive integers, and values of $L_d$ and $L_t$ may be set according to an actual situation.

Each SRS resource in an aperiodic SRS resource set is associated with an alternative spatial relation state through the MAC-CE signaling, and the spatial relation state in this embodiment is configured by the RRC layer signaling described above. In an embodiment, an power control parameter is configured for the aperiodic SRS resource set through the MAC-CE signaling, or a power control parameter is configured for an uplink reference signal resource indicator (SRI) codepoint. From the perspective of a user, an effective time of the MAC-CE signaling is determined by a transmission time of a HARQ-ACK associated with a PDSCH carried by the MAC-CE.

An SRS triggering state is triggered through DCI signaling, and then X aperiodic SRS resource sets are sent. X may be a positive integer, and a value of X is not limited.

In an embodiment, the spatial relation information (and a corresponding power control parameter) associated with the aperiodic SRS resource set is determined according to spatial relation information at the moment of the DCI signaling or the sending moment of the SRS. In an embodiment, the sending moment of the SRS is an initial sending moment of at least one SRS resource in the SRS resource set or an initial sending moment of at least one SRS resource in at least one SRS resource set associated with the SRS resource set.

In an embodiment of the present application, the control signaling further indicates a power control parameter of an uplink channel.

In a 5G communication system, since a flexibility of a beam configuration of an uplink data channel and an uplink reference signal is set to be higher than a flexibility of a power control parameter configuration of a data channel and a reference signal, so that power control parameters of an uplink data signal and an uplink reference signal in an actual system cannot be updated in time, causing a problem that the uplink interference is aggravated. For the technical problem described above, a solution for supporting synchronous updating of a power control parameter of the uplink data channel and a power control parameter of the uplink reference signal is not provided in the related art.

The control signaling in the present application may also be used for indicating the power control parameter of the uplink channel, and according to the present application, the spatial relation information of the uplink reference signal is configured according to the control signaling, such as the MAC-CE signaling, and sending of the uplink reference signal and a power control parameter of an uplink data channel associated with the uplink reference signal are designated. Therefore, the rapid cooperation of uplink interference management under the base station and the user terminal (terminal) is ensured, the situation that the user end supports a multi-antenna panel is considered, and thus the system performance is remarkably improved.

In an embodiment of the present application, a condition under which the power control parameter of the uplink channel is indicated through the control signaling is that: the uplink reference signal is used for a non-codebook mode or a codebook mode.

In an embodiment of the present application, the uplink channel includes a physical uplink shared channel or a physical uplink control channel.

When the uplink channel includes the physical uplink shared channel or the physical uplink control channel, the uplink reference signal is used for a non-codebook mode or a codebook mode.

In an embodiment of the present application, the step in which the power control parameter of the uplink channel is indicated includes: a closed-loop power control value of the uplink channel is reset.

When the power control parameter of the uplink channel is indicated, the closed-loop power control value may be reset so as to achieve a zero clearing effect.

In an embodiment of the present application, a condition under which the closed-loop power control value of the uplink channel is reset includes that: an uplink reference signal associated with the uplink channel is used for a non-codebook mode or a codebook mode.

In an embodiment of the present application, the step in which the power control parameter of the uplink channel is indicated further includes: the power control parameter of the uplink channel is determined according to a power control parameter of an uplink reference signal associated with the uplink channel.

When the power control parameter of the uplink channel is indicated through the control signaling, the power control parameter of the uplink channel may be configured based on a power control parameter of an uplink reference signal associated with the uplink channel. The uplink reference signal associated with the uplink channel may be determined according to an uplink reference signal resource indication (SRI) codepoint corresponding to the uplink channel.

In an embodiment of the present application, a condition that the power control parameter of the uplink channel is determined according to the power control parameter of the uplink reference signal associated with the uplink channel includes that: the uplink reference signal is used for a non-codebook mode or a codebook mode.

In an embodiment of the present application, the step in which the power control parameter of the uplink channel is indicated includes at least one of: a path loss reference signal in the power control parameter of the uplink channel is determined according to a downlink reference signal associated with a spatial relation parameter of an uplink reference signal associated with the uplink channel; the path loss reference signal in the power control parameter of the uplink channel is determined according to a path loss reference signal of the uplink reference signal associated with the uplink channel; an open-loop power control parameter in the power control parameter of the uplink channel is determined according to an open-loop power control parameter of the uplink reference signal associated with the uplink channel; or a closed-loop power control index in the power control parameter of the uplink channel is determined according to a closed-loop power control index of the uplink reference signal associated with the uplink channel.

When the power control parameter of the uplink channel is indicated through the control signaling, it may be determined according to the power control parameter corresponding to the uplink reference signal associated with the uplink channel, for example, a path loss reference signal, an open-loop power control parameter and a closed-loop power control index of the uplink channel power control parameter are determined based on the path loss reference signal, the open-loop power control parameter and the closed-loop power control index of the uplink reference signal associated with the uplink channel, respectively.

In an embodiment, when the path loss reference signal in the uplink channel power control parameter is determined, the path loss reference signal may be determined according to a downlink reference signal associated with the spatial relation parameter of the uplink reference signal associated with the uplink channel, and the downlink reference signal may be a path loss reference signal of the uplink reference signal.

In an embodiment of the present application, a condition under which the power control parameter of the uplink channel is determined based on a path loss reference signal, an open-loop power control parameter and a closed-loop power control index in an associated uplink reference signal may be that: the associated uplink reference signal is used for a non-codebook mode or a codebook mode.

In an embodiment of the present application, the step in which the power control parameter of the uplink channel is indicated includes: an uplink reference signal resource indication (SRI) codepoint set is associated with the power control parameter of the uplink channel; where the SRI codepoint set is formed by grouping at least one SRI codepoint.

When the power control parameter of the uplink channel is indicated through the power control signaling, the power control parameter of the uplink channel may be determined based on the SRI codepoint set.

In an embodiment of the present application, the SRI codepoint set may be formed by using a bit map.

In an embodiment of the present application, the step in which the SRI codepoint set is formed by using the bit map includes: at least one SRI codepoint is corresponded to a bit position in the bit map; and in a case where a value at the bit position in the bit map is a specific value, corresponding SRI codepoints are selected to form the SRI codepoint set.

In an embodiment of the present application, one SRI codepoint set is associated with one power control parameter.

In an embodiment of the present application, the step in which the power control parameter of the uplink channel is indicated includes at least one: an element index in an open-loop power control parameter set in the power control parameter of the uplink channel is associated with an SRI codepoint through the control signaling, or an open-loop power control parameter value associated with an SRI codepoint is determined through the control signaling; an element index in a path loss reference signal set in the power control parameter of the uplink channel is associated with the SRI codepoint through the control signaling, or a path loss reference signal index associated with the SRI codepoint is determined through the control signaling; or a closed-loop power control index associated with the SRI codepoint is determined through the control signaling.

When the power control parameter of the uplink channel is indicated, the element index in the open-loop power control parameter set, the element index in the path loss reference signal set and/or the closed-loop power control index in the power control parameter may also be determined based on the SRI codepoint.

In an embodiment of the present application, the open-loop power control parameter set is configured by radio resource control signaling.

In an embodiment of the present application, the path loss reference signal set is configured by radio resource control signaling.

In this embodiment, the radio resource control signaling may be sent by the base station.

In an embodiment of the present application, in a case where the uplink channel transmission is scheduled, for example a PUSCH transmission is scheduled, the power control parameter associated with the uplink channel may be determined by a power control parameter under control signaling associated with the uplink reference signal sent the most recently (the last time).

In an embodiment, the power control parameter of the uplink reference signal indicated by the control signaling covers the power control parameter configured by the RRC signaling and/or the power control parameter of the uplink channel indicated by the control signaling covers the power control parameter configured by the RRC signaling.

For example, the power control parameter of the SRS determined (indicated) by the MAC-CE signaling covers the power control parameter configured by the RRC signaling. The power control parameter of the PUSCH determined (indicated) by the MAC-CE signaling covers the power control parameter configured by the RRC signaling.

Based on the above embodiments, according to the transmission indication method provided in the present application, the spatial relation information of the uplink reference signal is configured according to the MAC-CE signaling, and a power control parameter of the uplink reference signal and a power control parameter of an uplink data channel associated with the uplink reference signal are designated. Therefore, the rapid cooperative uplink interference management under the base station and the user end (terminal) is ensured, the situation that the user end supports a multi-antenna panel is considered, and thus the system performance is remarkably improved.

Exemplarily, Table 3 is a schematic diagram of a signaling format of control signaling for configuring SRS and PUSCH power control parameters in the present application.

Table 3 shows a signaling format of the control signaling for configuring a power control parameter of the SRS and a power control parameter of the PUSCH in the present application.

TABLE 3

| a signaling format of the control signaling for configuring a power control parameter of the SRS and a power control parameter of the PUSCH in the present application |
| --- |
| SRS resource set index |

| | |
| --- | --- |
| SRS resource set: | P0/alpha/reference signal index/closed-loop power control index |
| SRI = 0: | P0/alpha/reference signal index/closed-loop power control index |
| SRI = 1: | P0/alpha/reference signal index/closed-loop power control index |
| . . . | . . . |
| SRI = n − 1: | P0/alpha/reference signal index/closed-loop power control index |

Referring to Table 3, considering that a sending beam of the PUSCH is determined by beam information of the SRS in the non-codebook mode or the codebook mode, in a case where the SRS is configured in the non-codebook mode or the codebook mode, the control signaling needs to provide a power control parameter for an SRI codepoint associated with each PUSCH transmission except that the power control parameter is provided for the SRS resource set. For example, in a case of SRI=i, a corresponding power control parameter is given by the control signaling, and in a case where the DCI indicates that SRI=I is used for the PUSCH transmission, the user end needs to send the PUSCH according to the configured power control parameter.

Figures 5, 6, 7:
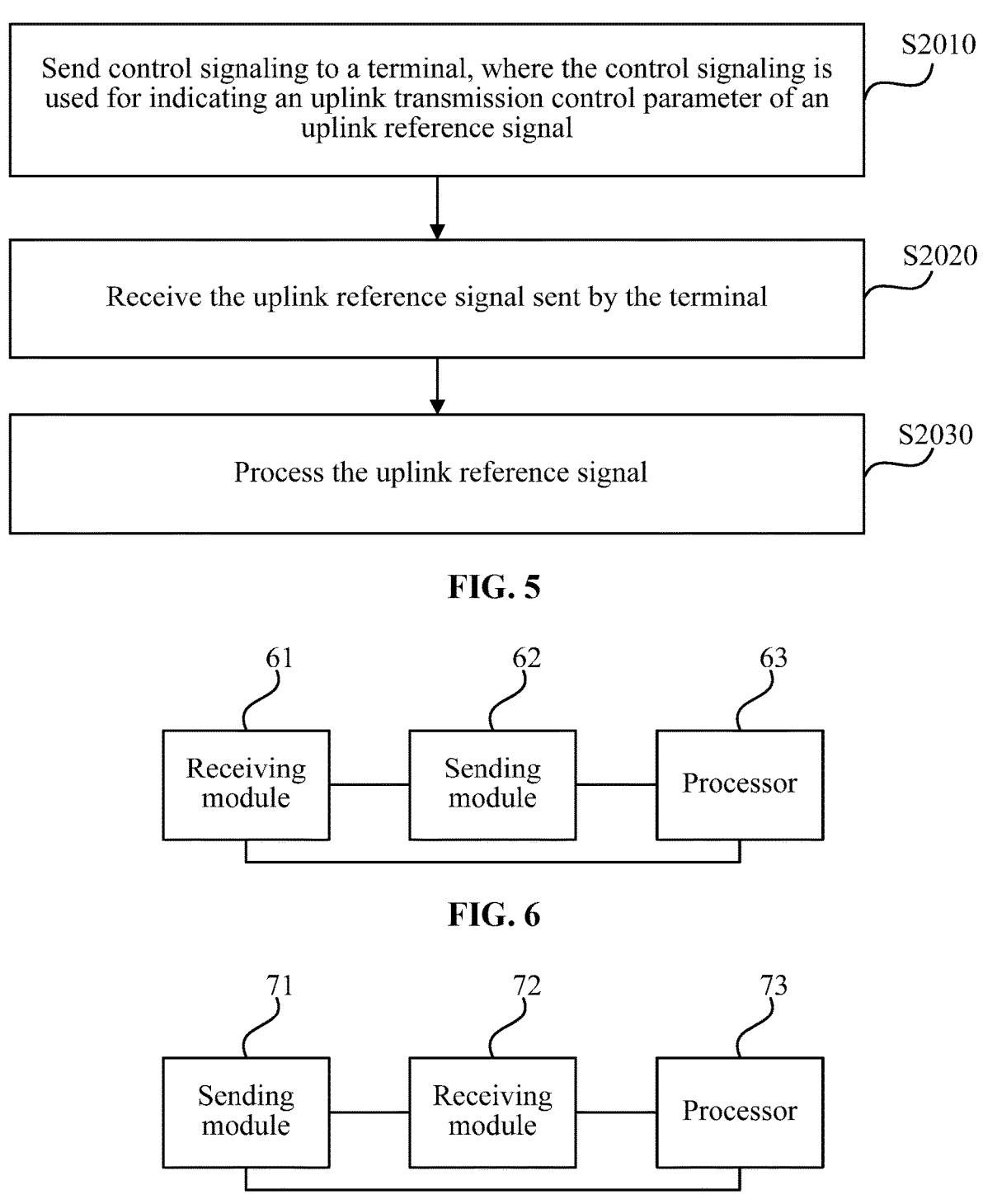
FIG. 5 is a schematic flowchart of another transmission indication method provided in the present application.
FIG. 6 is a schematic structural diagram of a transmission indication apparatus provided in the present application.
FIG. 7 is a schematic structural diagram of another transmission indication apparatus provided in the present application.

FIG. 5 is a schematic flowchart of another transmission indication method provided in the present application. The present application further provides a transmission indication method applied to a base station, as shown in FIG. 5, and the method includes the following steps.

In S2010, control signaling is sent to a terminal; where the control signaling is used for indicating an uplink transmission control parameter of an uplink reference signal.

In S2020, the uplink reference signal sent by the terminal is received.

In S2030, the uplink reference signal is processed.

According to the transmission indication method provided in this embodiment, the control instruction is sent to the terminal so as to instruct the terminal to indicate the uplink transmission control parameter of the uplink reference signal based on the control instruction, then the uplink reference signal sent by the terminal is received, and the uplink reference signal is processed, so that the terminal can synchronously update the uplink transmission control parameter.

In an embodiment of the present application, the control signaling includes media access control-control element (MAC-CE) signaling.

In an embodiment of the present application, the uplink reference signal includes a channel sounding reference signal, a phase tracking reference signal, and a physical random access channel.

In an embodiment, the control instruction sent by the base station to the terminal may also be used for indicating the power control parameter of the uplink channel. The Uplink channel includes a physical uplink shared channel or a physical uplink control channel.

The present application provides a transmission indication apparatus, FIG. 6 is a schematic structural diagram of a transmission indication apparatus provided in the present application. As shown in FIG. 6, the transmission indication apparatus in the embodiments of the present application may be integrated on the terminal provided in the embodiments of the present application. The apparatus includes: a receiving module 61, a sending module 62 and at least one processor 63. The receiving module 61 is configured to receive control signaling sent by a base station. The sending module 62 is configured to transmit an uplink reference signal based on an uplink transmission control parameter. The at least one processor 63 is configured to indicate the uplink transmission control parameter of the uplink reference signal through the control signaling.

The transmission indication apparatus provided in this embodiment is used for implementing the transmission indication method in the embodiment shown in FIG. 2, and the implementation principle and the technical effect of the transmission indication apparatus provided in this embodiment are similar to those of the transmission indication method of the embodiment shown in FIG. 2, which however are not to be detailed here again.

In an embodiment of the present application, the uplink transmission control parameter includes a power control parameter.

In an embodiment of the present application, the at least one processor is configured to indicate the uplink transmission control parameter of the uplink reference signal through the control signaling in at least one of the following manners: an open-loop power control parameter in the power control parameter is associated with a resource set of the uplink reference signal through the control signaling; an element index in an open-loop power control parameter set in the power control parameter is associated with a resource set of the uplink reference signal through the control signaling; a path loss reference signal in the power control parameter is associated with the resource set of the uplink reference signal through the control signaling; an element index in a path loss reference signal set in the power control parameter is associated with the resource set of the uplink reference signal through the control signaling; or a closed-loop power control index in the power control parameter is associated with the resource set of the uplink reference signal through the control signaling.

In an embodiment of the present application, when the power control parameter is determined based on the resource set of the uplink reference signal, the uplink reference signal is used for beam management, a codebook mode, a non-codebook mode, antenna switching, or positioning.

In an embodiment of the present application, the at least one processor is configured to indicate the uplink transmission control parameter of the uplink reference signal through the control signaling in at least one of the following manners: an open-loop power control parameter in the power control parameter is associated with an uplink reference signal resource in a resource set of the uplink reference signal through the control signaling; or an element index in an open-loop power control parameter set in the power control parameter is associated with an uplink reference signal resource in a resource set of the uplink reference signal through the control signaling; a path loss reference signal in the power control parameter is associated with the uplink reference signal resource in the resource set of the uplink reference signal through the control signaling; or an element index in a path loss reference signal set in the power control parameter is associated with the uplink reference signal resource in the resource set of the uplink reference signal through the control signaling; or a closed-loop power control index in the power control parameter is associated with the uplink reference signal resource in the resource set of the uplink reference signal through the control signaling.

In an embodiment of the present application, when the power control parameter is determined based on the uplink reference signal resource in the resource set of the uplink reference signal, the uplink reference signal is used for a non-codebook mode, antenna switching, or positioning.

In an embodiment of the present application, the at least one processor is further configured to: in a case where an aperiodic uplink reference signal is triggered, a power control parameter of the aperiodic uplink reference signal is determined according to a power control parameter at a transmission moment of downlink control information (DCI) of the triggered aperiodic uplink reference signal or a downlink control channel of the triggered aperiodic uplink reference signal.

In an embodiment of the present application, the at least one processor is further configured to: in a case where an aperiodic uplink reference signal is triggered, a power control parameter of the aperiodic uplink reference signal is determined according to a power control parameter at a sending moment of the triggered aperiodic uplink reference signal.

In an embodiment of the present application, the at least one processor is further configured to: in a case where an aperiodic uplink reference signal is triggered, a power control parameter of the aperiodic uplink reference signal is determined according to a power control parameter at an initial sending moment of an uplink reference signal resource set associated with a triggering state of the triggered aperiodic uplink reference signal.

In an embodiment of the present application, the at least one processor is further configured to: in a case where an aperiodic uplink reference signal is triggered, a power control parameter of the aperiodic uplink reference signal is determined according to a power control parameter at an initial sending moment of at least one uplink reference signal resource set associated with the triggered aperiodic uplink reference signal.

In an embodiment of the present application, the control signaling also indicates a power control parameter of an uplink channel.

In an embodiment of the present application, the uplink channel includes a physical uplink shared channel or a physical uplink control channel.

In an embodiment of the present application, the step in which the power control parameter of the uplink channel is indicated includes: a closed-loop power control value of the uplink channel is reset.

In an embodiment of the present application, a condition for indicating the power control parameter of the uplink channel is that the uplink reference signal is used for a non-codebook mode or a codebook mode.

In an embodiment of the present application, the characteristic that the at least one processor is configured to indicate the power control parameter of the uplink channel further includes: the power control parameter of the uplink channel is determined according to a power control parameter of an uplink reference signal associated with the uplink channel.

In an embodiment of the present application, the at least one processor is configured to indicate the power control parameter of the uplink channel in at least one of the following manners: a path loss reference signal in the power control parameter of the uplink channel is determined according to a downlink reference signal associated with a spatial relation parameter of an uplink reference signal associated with the uplink channel; the path loss reference signal in the power control parameter of the uplink channel is determined according to a path loss reference signal of the uplink reference signal associated with the uplink channel; an open-loop power control parameter in the power control parameter of the uplink channel is determined according to an open-loop power control parameter of the uplink reference signal associated with the uplink channel; or a closed-loop power control index in the power control parameter of the uplink channel is determined according to a closed-loop power control index of the uplink reference signal associated with the uplink channel.

In an embodiment of the present application, the uplink reference signal associated with the uplink channel is used for a non-codebook mode or a codebook mode.

In an embodiment of the present application, the at least one processor is configured to indicate the power control parameter of the uplink channel in the following manners: an uplink reference signal resource indication (SRI) codepoint set is associated with the power control parameter of the uplink channel; where the SRI codepoint set is formed by grouping at least one SRI codepoint.

In an embodiment of the present application, the at least one processor is further configured to form the SRI codepoint set by using a bit map.

In an embodiment of the present application, the at least one processor is configured to form the SRI codepoint set by using the bit map in the following manners: at least one SRI codepoint corresponds to a bit position in the bit map; and in a case where a value at the bit position in the bit map is a specific value, corresponding SRI codepoints are selected to form the SRI codepoint set.

In an embodiment of the present application, the at least one processor is configured to indicate the power control parameter of the uplink channel in at least one of the following manners: an element index in an open-loop power control parameter set in the power control parameter of the uplink channel is associated with an SRI codepoint through the control signaling, or an open-loop power control parameter value associated with an SRI codepoint is determined through the control signaling; an element index in a path loss reference signal set in the power control parameter of the uplink channel is associated with the SRI codepoint through the control signaling, or a path loss reference signal index associated with the SRI codepoint is determined through the control signaling; or a closed-loop power control index associated with the SRI codepoint is determined through the control signaling.

In an embodiment of the present application, the open-loop power control parameter set is configured by radio resource control signaling.

In an embodiment of the present application, the path loss reference signal set is configured by radio resource control signaling.

In an embodiment of the present application, the uplink transmission control parameter includes a spatial relation parameter.

In an embodiment of the present application, the at least one processor is configured to indicate the uplink transmission control parameter of the uplink reference signal through the control signaling in the following manners: the uplink reference signal is activated or deactivated through the control signaling, or a spatial relation parameter of the uplink reference signal is configured; where the uplink reference signal is a semi-persistent uplink reference signal.

In an embodiment of the present application, the at least one processor is configured to indicate the uplink transmission control parameter of the uplink reference signal through the control signaling in the following manners: a spatial relation parameter of the uplink reference signal is configured through the control signaling; where the uplink reference signal is an aperiodic uplink reference signal.

In an embodiment of the present application, the control signaling includes a grouping index in a case where a reference signal with which the spatial relation parameter is associated is a downlink reference signal.

In an embodiment of the present application, the control signaling includes a grouping index in a case where the uplink reference signal is used for beam management or antenna switching.

In an embodiment of the present application, the spatial relation parameter is selected from an spatial relation parameter set, where the spatial relational parameter set is configured by radio resource control signaling.

In an embodiment of the present application, the at least one processor is configured to indicate the uplink transmission control parameter of the uplink reference signal through the control signaling in the following manners: in a case where an aperiodic uplink reference signal is triggered through the control signaling, a spatial relation parameter associated with the triggered uplink reference signal is determined according to a spatial relation parameter at a transmission moment of downlink control information (DCI) of the triggered uplink reference signal or a downlink control channel of the triggered uplink reference signal.

In an embodiment of the present application, the at least one processor is configured to indicate the uplink transmission control parameter of the uplink reference signal through the control signaling in the following manners: in a case where an aperiodic uplink reference signal is triggered through the control instruction, a spatial relation parameter associated with the triggered uplink reference signal is determined according to a spatial relation parameter at a sending moment of the triggered uplink reference signal.

In an embodiment of the present application, the at least one processor is configured to indicate the uplink transmission control parameter of the uplink reference signal through the control signaling in the following manners: in a case where an aperiodic uplink reference signal is triggered through the control instruction, a spatial relation parameter associated with the triggered uplink reference signal is determined according to a spatial relation parameter at an initial sending moment of an uplink reference signal resource set associated with a triggering state of the triggered uplink reference signal.

In an embodiment of the present application, the at least one processor is configured to indicate the uplink transmission control parameter of the uplink reference signal through the control instruction in the following manners: in a case where the aperiodic uplink reference signal is triggered through the control signaling, a spatial relation parameter associated with the triggered uplink reference signal is determined according to a spatial relation parameter at an initial sending moment of at least one uplink reference signal resource set associated with the triggered uplink reference signal.

In an embodiment of the present application, the at least one uplink reference signal resource set associated with the uplink reference signal is used for antenna switching.

In an embodiment of the present application, the control signaling includes media access control-control element (MAC-CE) signaling.

In an embodiment of the present application, the uplink reference signal includes a channel sounding reference signal, a phase tracking reference signal, and a physical random access channel.

In an embodiment of the present application, an effective time of an indication of the control signaling is determined by a sending time of hybrid automatic repeat request-acknowledgement (HARQ-ACK) signaling associated with a physical downlink shared channel carrying the control signaling.

The present application further provides a transmission indication apparatus. FIG. 7 is a schematic structural diagram of another transmission indication apparatus provided in the present application. As shown in FIG. 7, the transmission indication apparatus provided in the embodiments of the present application may be integrated on a base station provided in the embodiments of the present application, and the transmission indication apparatus includes a sending module 71, a receiving module 72 and at least one processor 73. The sending module 71 is configured to send control signaling to a terminal, where the control signaling is used for indicating an uplink transmission control parameter of an uplink reference signal. The receiving module 72 is configured to receive the uplink reference signal sent by the terminal. The at least one processor is configured to process the uplink reference signal.

The transmission indication apparatus provided in this embodiment is used for implementing the transmission indication method in the embodiment shown in FIG. 5, and the implementation principle and the technical effect of the transmission indication apparatus integrated on the base station in this embodiment are similar to those of the transmission indication method of the embodiment shown in FIG. 5, which however are not to be detailed here again.

In an embodiment of the present application, the control signaling includes media access control-control element (MAC-CE) signaling.

In an embodiment of the present application, the uplink reference signal includes a channel sounding reference signal, a phase tracking reference signal, and a physical random access channel.

An embodiment of the present application further provides a terminal. The terminal includes the transmission indication apparatus as provided in FIG. 6 and in the embodiment of the present application.

The terminal provided in this embodiment includes the transmission indication apparatus shown in FIG. 6, and the implementation principle and the technical effect upon performing the transmission indication are similar to those of the transmission indication apparatus shown in the embodiment of FIG. 6, which are not to be detailed here again.

An embodiment of the present application further provides a base station. The base station includes the transmission indication apparatus as provided in FIG. 7 and in the embodiment of the present application.

The base station provided in this embodiment includes the transmission indication apparatus shown in FIG. 7, and the implementation principle and the technical effect upon performing the transmission indication are similar to those of the transmission indication apparatus shown in the embodiment of FIG. 7, which however are not to be detailed here again.

An embodiment of the present application further provides a storage medium, a computer program is stored in the storage medium, and the computer program, when executed by a processor, performs the transmission indication method of any one of the embodiments of the present application, such as the transmission indication method applied to the terminal and the transmission indication method applied to the base station. The transmission indication method is applied to the terminal and includes: control signaling sent by a base station is received; an uplink transmission control parameter of an uplink reference signal is indicated through the control signaling; and the uplink reference signal is transmitted based on the uplink transmission control parameter.

The transmission indication method applied to the base station includes: control signaling is sent to a terminal, where the control signaling is used for indicating an uplink transmission control parameter of an uplink reference signal; the uplink reference signal sent by the terminal is received; and the uplink reference signal is processed.

The above description is only an exemplary embodiment of the present application, and is not intended to limit the scope of protection of the present application.

The term terminal encompasses any suitable type of wireless user equipment, such as a mobile telephone, a portable data processing apparatus, a portable web browser, or an in-vehicle mobile station.

The various embodiments of the present application may be implemented in a hardware or a special purpose circuit, a software, a logic or any combination thereof. For example, some aspects may be implemented in hardware, while other aspects may be implemented in firmware or software which may be executed by a controller, a microprocessor or other computing apparatus, although the present application is not limited thereto.

The embodiments of the present application may be implemented by the execution of computer program instructions by a data processor of the mobile apparatus, e.g., in a processor entity, or by hardware, or by a combination of software and hardware. The computer program instructions may be assembler instructions, instruction set architecture (ISA) instructions, machine instructions, machine dependent instructions, microcodes, firmware instructions, state-setting data, or either a source code or an object code written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory apparatus and system (digital video disc (DVD), or a compact disk (CD)). A computer readable medium may include a non-instantaneous storage medium. A data processor may be of any type suitable for the local technical environment, such as, but not limited to, a general-purpose computer, a specialized computer, a microprocessor, a digital signal processor (DSP), an application specific integrated circuit (ASIC), a field-programmable gate array (FPGA)), and a processor based on a multi-core processor architecture.

What is claimed is:

1. A transmission indication method, applied to a terminal, comprising:

receiving, from a base station, control signaling for a transmission of an uplink reference signal comprising an aperiodic Sounding Reference Signal (SRS), wherein the control signaling comprises a media access control-control element (MAC-CE) signaling;

acquiring an uplink transmission control parameter of the uplink reference signal based on the control signaling, wherein an activation time of the uplink transmission control parameter is determined by a sending time of hybrid automatic repeat request-acknowledgement (HARQ-ACK) signaling associated with a physical downlink shared channel carrying the control signaling;

acquiring a power control parameter of an uplink channel based on the control signaling;

receiving a Downlink Control Information (DCI) which triggers the uplink reference signal, wherein the DCI is transmitted at a DCI transmission moment;

determining spatial relation information associated with the uplink reference signal according to spatial relation information at a sending moment of the triggered uplink reference signal; and transmitting the uplink reference signal based on the uplink transmission control parameter, the power control parameter, and the determined spatial relation information.

2. The method of claim 1, wherein, in response to a reference signal with which the spatial relation parameter is associated being a downlink reference signal, or in response to the uplink reference signal being used for beam management or antenna switching, the control signaling comprises a grouping index.

3. The method of claim 1, wherein the power control parameter of the uplink channel comprises a pathloss reference signal.

4. The method of claim 1, wherein acquiring the power control parameter of the uplink channel comprises at least one of:

acquiring the power control parameter of the uplink channel according to a power control parameter of an uplink reference signal associated with the uplink channel;

acquiring a path loss reference signal in the power control parameter of the uplink channel according to a downlink reference signal associated with a spatial relation parameter of an uplink reference signal associated with the uplink channel;

acquiring the path loss reference signal in the power control parameter of the uplink channel according to a path loss reference signal of the uplink reference signal associated with the uplink channel;

acquiring an open-loop power control parameter in the power control parameter of the uplink channel according to an open-loop power control parameter of the uplink reference signal associated with the uplink channel; or acquiring a closed-loop power control index in the power control parameter of the uplink channel according to a closed-loop power control index of the uplink reference signal associated with the uplink channel.

5. The method of claim 1, wherein the aperiodic SRS is used for at least one of: a codebook mode, a non-codebook mode, a beam management, or an antenna switching or positioning.

6. A terminal comprising a memory for storing computer instructions and a processor in communication with the memory, wherein, when the processor executes the computer instructions, the processor is configured to cause the terminal to:

receive, from a base station, control signaling for a transmission of an uplink reference signal comprising an aperiodic Sounding Reference Signal (SRS), wherein the control signaling comprises a media access control-control element (MAC-CE) signaling;

acquire an uplink transmission control parameter of an uplink reference signal based on the control signaling, wherein an activation time of the uplink transmission control parameter is determined by a sending time of hybrid automatic repeat request-acknowledgement (HARQ-ACK) signaling associated with a physical downlink shared channel carrying the control signaling;

acquire a power control parameter of an uplink channel based on the control signaling;

receive a Downlink Control Information (DCI) which triggers the uplink reference signal, wherein the DCI is transmitted at a DCI transmission moment;

determine spatial relation information associated with the uplink reference signal according to spatial relation information at a sending moment of the triggered uplink reference signal; and transmit the uplink reference signal based on the uplink transmission control parameter, the power control parameter, and the determined spatial relation information.

7. The terminal of claim 6, wherein, in response to a reference signal with which the spatial relation parameter is associated being a downlink reference signal, or in response to the uplink reference signal being used for beam management or antenna switching, the control signaling comprises a grouping index.

8. The terminal of claim 6, wherein the power control parameter of the uplink channel comprises a pathloss reference signal.

9. The terminal of claim 6, when the processor is configured to cause the terminal to acquire the power control parameter of the uplink channel, the processor is configured to cause the terminal to perform at least one of:

acquiring the power control parameter of the uplink channel according to a power control parameter of an uplink reference signal associated with the uplink channel;

acquiring a path loss reference signal in the power control parameter of the uplink channel according to a downlink reference signal associated with a spatial relation parameter of an uplink reference signal associated with the uplink channel;

acquiring the path loss reference signal in the power control parameter of the uplink channel according to a path loss reference signal of the uplink reference signal associated with the uplink channel;

acquiring an open-loop power control parameter in the power control parameter of the uplink channel according to an open-loop power control parameter of the uplink reference signal associated with the uplink channel; or acquiring a closed-loop power control index in the power control parameter of the uplink channel according to a closed-loop power control index of the uplink reference signal associated with the uplink channel.

10. The terminal of claim 6, wherein the aperiodic SRS is used for at least one of: a codebook mode, a non-codebook mode, a beam management, or an antenna switching or positioning.

11. A transmission indication method, applied to a base station, comprising:

sending, to a terminal, control signaling for a transmission of an uplink reference signal comprising an aperiodic Sounding Reference Signal (SRS), wherein the control signaling comprises a media access control-control element (MAC-CE) signaling and is used for indicating an uplink transmission control parameter and a power control parameter of an uplink reference signal; and wherein an activation time of the uplink transmission control parameter is determined by a sending time of hybrid automatic repeat request-acknowledgement (HARQ-ACK) signaling associated with a physical downlink shared channel carrying the control signaling;

sending a Downlink Control Information (DCI) at a DCI transmission moment which triggers the uplink reference signal;

receiving the uplink reference signal sent by the terminal based on the uplink transmission control parameter and spatial relation information associated with the uplink reference signal determined according to spatial relation information determined at a sending moment of the triggered uplink reference signal; and processing the uplink reference signal.

12. The transmission indication method of claim 11, wherein the aperiodic SRS is used for at least one of: a codebook mode, a non-codebook mode, a beam management, or an antenna switching or positioning.

13. A base station comprising a memory for storing computer instructions and a processor in communication with the memory, wherein, when the processor executes the computer instructions, the processor is configured to cause the base station to:

send, to a terminal, control signaling for a transmission of an uplink reference signal comprising an aperiodic Sounding Reference Signal (SRS), wherein the control signaling comprises a media access control-control element (MAC-CE) signaling and is used for indicating an uplink transmission control parameter and a power control parameter of an uplink reference signal and wherein an activation time of the uplink transmission control parameter is determined by a sending time of hybrid automatic repeat request-acknowledgement (HARQ-ACK) signaling associated with a physical downlink shared channel carrying the control signaling;

send a Downlink Control Information (DCI) at a DCI transmission moment which triggers the uplink reference signal;

receive the uplink reference signal sent by the terminal based on the uplink transmission control parameter and spatial relation information associated with the uplink reference signal determined according to spatial relation information determined at a sending moment of the triggered uplink reference signal; and process the uplink reference signal.

14. The base station of claim 13, wherein the aperiodic SRS is used for at least one of: a codebook mode, a non-codebook mode, a beam management, or an antenna switching or positioning.

* * * * *